United States Patent [19]

Schotz

[11] 4,038,635

[45] July 26, 1977

[54] VEHICLE INTRUSION ALARM CIRCUIT

[76] Inventor: Larry A. Schotz, 6220 N. Sunny Point Road, Glendale, Wis. 53217

[21] Appl. No.: 646,095

[22] Filed: Jan. 2, 1976

[51] Int. Cl.² .............................................. B60R 25/10
[52] U.S. Cl. ................................. 340/63; 340/274 R; 307/10 AT; 307/350; 180/114
[58] Field of Search ........................ 340/63, 64, 274 R; 307/235 R, 235 J, 130, 236, 10 AT; 180/114

[56] References Cited

U.S. PATENT DOCUMENTS

| | | | |
|---|---|---|---|
| 3,808,466 | 4/1974 | Campbell | 307/235 J X |
| 3,956,732 | 5/1976 | Teich | 340/64 |

Primary Examiner—Alvin H. Waring
Attorney, Agent, or Firm—Wheeler, Morsell, House & Fuller

[57] ABSTRACT

An audible alarm is set off by unauthorized opening of a vehicle's doors, trunk or hood. The alarm circuit includes an operational amplifier and means coupling both operational amplifier inputs to the ungrounded vehicle battery terminal through balanced input resistors. A capacitor is coupled between one operational amplifier input and ground. When the door or trunk is opened, a light is automatically switched on, thus causing the battery voltage to drop slightly and producing an output signal from the operational amplifier which energizes an audible alarm coupled thereto. A key switch which is accessible from the outside the vehicle can be turned to disable the alarm circuit to permit authorized entry of the vehicle. The differential input of the operational amplifier stabilizes the circuit's operating characteristics with respect to temperature and prevents malfunction at temperature extremes. The differential input also prevents false triggering due to lightning, electronic ignition on passing vehicles, radiation from nearby radio transmitters, etc. The alarm circuit includes a two-tone audio oscillator whose frequency is shifted periodically between fixed values by another oscillator.

16 Claims, 1 Drawing Figure

U.S. Patent  July 26, 1977  4,038,635
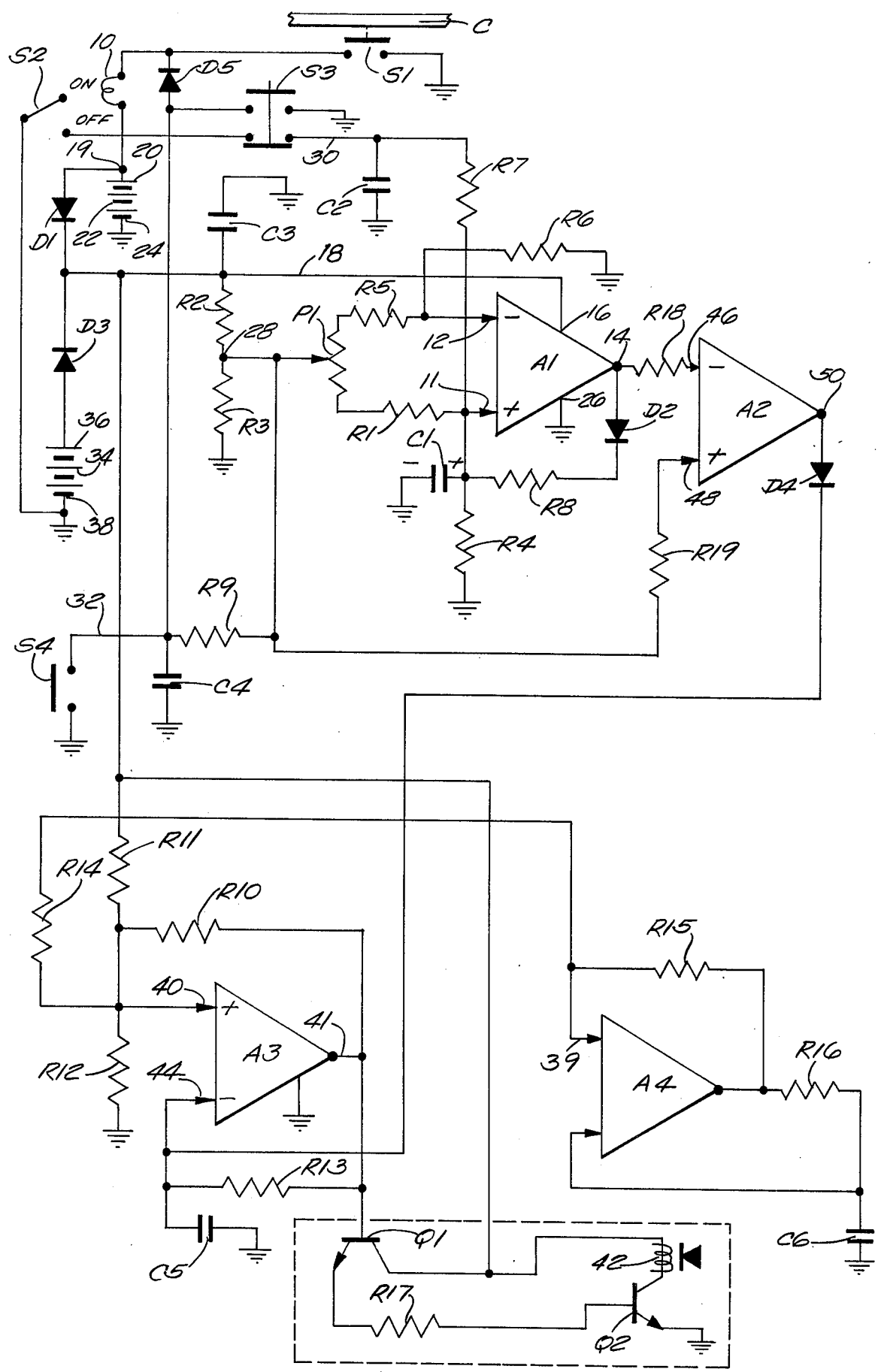

4,038,635

VEHICLE INTRUSION ALARM CIRCUIT

BACKGROUND OF THE INVENTION

This invention relates to vehicle intrusion alarm circuits for sounding an audible alarm in response to unauthorized entry of the vehicle. Known prior art intrusion alarm circuits are disclosed in U.S. Pat. Nos. 3,706,966; 3,815,088; and 3,831,141. All of these prior art circuits utilized silicon controlled rectifiers or triacs as the triggering elements for energizing the alarm. However, silicon controlled rectifiers and triacs are quite sensitive to temperature changes and are subject to malfunction at normal environmental temperature extremes. Also, silicon controlled rectifiers and triacs are subject to false triggering due to lightning, electronic ignition on passing vehicles, radiation from nearby radio transmitters, and other outside electrical noises or signals.

The prinicpal object of this invention is to provide an improved vehicle intrusion alarm circuit which is not subject to malfunction at temperature extremes and which is not subject to false triggering by outside electrical noise or signal sources. Other objects and advantages of the invention will be apparent from the description which follows.

SUMMARY OF THE INVENTION

Both inputs of an operational amplifier are coupled to the ungrounded battery terminal of a vehicle which has a closed compartment, an openable compartment closure, at least one electrical load element coupled to the battery, and means for energizing the load element when the compartment closure is opened. A capacitor is coupled between one input of the operational amplifier and ground. An alarm means is coupled to the operational amplifer output and is operable to produce an audible alarm signal in response to an output signal of the operational amplifier caused by the opening of the compartment closure. An alarm disabling means accessible from outside the vehicle is coupled to the intrusion alarm circuit for disabling the same to permit opening of the compartment closure without activating the alarm. The differential input of the operational amplifier stabilizes the circuits's operating characteristics with respect to temperature and prevents malfunction at temperature extremes. The differential input also prevents false triggering due to lightning, electronic ignition on passing vehicles, radiation from nearby radio transmitters, and other outside electrical noises or signals.

DESCRIPTION OF THE DRAWING

The drawing FIGURE is a schematic circuit diagram of the preferred embodiment of the invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, the alarm circuit of this invention is designed for use in combination with a vehicle (not shown) having one or more compartments (passenger compartment, engine compartment, trunk) which are closed by openable closures C (doors, hood) and which have at least one normally open switch S1 connected in series with an electrical load element such as a lamp 10 which is energized from the vehicle's battery 22 when switch S1 is closed in response to the opening of the corresponding vehicle closure C. The energization of load element 10 causes the voltage of battery 22 to decrease and actuates an audible alarm as described hereinafter.

The alarm circuit includes a conventional operational amplifier A1 having a positive signal input 11, a negative signal input 12, and a signal output 14. The output voltage of operational amplifier A1 is proportional to the difference of the two input voltages. Operating power is supplied to operational amplifier A1 through power input 16 by a conductor 18 which is coupled through diode D1 and power input terminal 19 to the ungrounded (in this case positive) terminal 20 of verhicle battery 22, whose negative terminal 24 is grounded to the vehicle's frame. Operational amplifier A1 has a ground terminal 26 which is also coupled to the vehicle's frame. Diode D1 serves to protect the circuit against reverse polarity if power input terminal 19 is connected to the wrong terminal of battery 22.

Positive signal input 11 of operational amplifier A1 is coupled through resistor R1 and potentiometer P1 to the center tap 28 of a voltage divider comprising resistors R2 and R3 which are coupled in series between power input conductor 18 and ground. Positive signal input 11 is also coupled to ground through a resistor R4. Negative signal input 12 is coupled to potentiometer P1 through resistor R5 and is coupled to ground through resistor R6. To balance the inputs 11 and 12 with respect to temperature induced variations, R1 and R5 are preferably the same type and are equal in resistance value and R4 and R6 are preferably the same type and are equal in resistance value. Resistors R2 and R3 are selected to produce the desired voltage level on the arm of potentiometer P1, and the arm of potentiometer P1 is initially adjusted to provide the same input voltage on both inputs 11 and 12 of amplifier A1 so that the output voltage at output 14 is normally zero. A capacitor C1 is coupled between positive signal input 11 and ground. Capacitor C1 normally charges up to the voltage level which is applied to positive signal input 11.

A key toggle switch S2 is mounted on the vehicle in a position where it is accessible from the outside of the vehicle. The operator of the vehicle turns S2 to the ON position to enable the intrusion alarm circuit when he or she leaves the vehicle and turns S2 to the OFF position to disable the intrusion alarm circuit before re-entering the vehicle. A push-button switch S3 having normally closed contacts and normally open contacts has its normally closed contacts coupled in series with switch S1 for reasons explained hereinafter. When turned to the OFF position, switch S2 applies a ground to one end of resistor R7 whose other end is coupled to positive signal input 11 of amplifier A1. Resistor R7 is also grounded through filter capacitor C2, which filters out any voltage spikes that may appear on conductor 30. Filter capacitor C3 serves the same purpose for conductor 18. When switch S2 is turned to the ON position, the direct ground is removed from resistor R7, which then floats and thus, has no effect on the input circuit of operational amplifier A1.

In the operation of the circuit, assuming switch S2 is turned to its ON position, the voltages on signal inputs 11 and 12 of operational amplifier A1 are initially equal and thus, there is no output voltage on output 14. Capacitor C1 is charged up to the full voltage applied to positive signal input 11 with the polarity shown in the drawing. If one of the vehicle's doors is opened with switch S2 in the ON position, switch S1 will close and will energize lamp 10 and this will drain current from battery 22 and thus, cause a small decrease in the voltage thereof. The decrease in the voltage is coupled directly to both signal inputs 11 and 12 of operational amplifier A1, but although the voltage decreases immediately on negative signal input 12, the voltage on positive signal input 11 is held up for a short period of time by the charge on capacitor C1. Thus, in the short space of time that is required for capacitor C1 to discharge down to the new voltage level on positive signal input 11, there is a net positive difference between the voltages applied to signal inputs 11 and 12, and thus the output of amplifier A1 rises from zero to a positive voltage on the signal output 14. This positive output voltage is fed back to positive signal input 11 through diode D2 and resistor R8 to drive operational amplifier A1 to saturation and thus, to change the voltage on signal output 14 from zero to the full positive battery voltage. This positive output voltage triggers the alarm as is described hereinafter. The positive feedback through diode D2 and resistor R8 latches operational amplifier A1 in the full positive output condition even when lamp 10 is subsequently turned off. The only way that operational amplifier A1 can be returned to its zero output state is to turn key switch S2 to its OFF position, which places a direct ground on resistor R7 and drops the voltage level on positive signal input 11 below the voltage level on negative signal input 12. This causes the voltage on signal output 14 to go negative and to remain negative as long as key switch S1 is in the OFF position. This negative output disables the alarm as described hereinafter.

For closures such as the hood which may not energize a light when they are opened, separate normally open switches such as switch S4 are added to the vehicle with actuation means (not shown) to close the switch when the hood or other closure is opened. Switch S4 is wired to apply a ground to one end of resistor R9 whose other end is coupled to the center tap 28 of the power supply voltage divider. This lowers the voltage on center tap 28 and activates the alarm in the same manner as the voltage decrease due to energization of a load element such as lamp 10. Any desired number of normally open switches can be added in parallel with switch S4 to protect against the unauthorized opening of closures that do not automatically energize a load element when they are opened.

Capacitor C4, which is coupled in parallel with switch S4, filters out any voltage spikes that may appear on conductor 32.

A separate battery 34 has its positive terminal 36 coupled through diode D3 to conductor 18 to power the intrusion alarm circuit in case vehicle battery 22 should fail or in case any of the conductors carrying power to conductor 18 should be cut or disconnected. If the voltage input from vehicle battery 22 to conductor 18 should be interrupted, this interruption will trigger the alarm circuit as described above due to the decrease in voltage, the circuit then bein powered by separate battery 34. The voltage of battery 34 is less than the voltage of the vehicle battery 22. Diode D3 blocks reverse current flow battery 34 that would otherwise occur due to the higher voltage of vehicle battery 22.

Switch S3 is a momentary contact panic button which is mounted on the vehicle's dashboard within easy reach of the driver and has a set of normally closed contacts which are coupled in series with switch S2 and a set of normally open contacts which are coupled in parallel with switch S4. Switch S3 can be manually depressed to sound the alarm while the driver is in the car. This may be necessary when a suspicious acting person approaches the car while the operator is starting the car in a parking lot or is stopped at a traffic light or in other appropriate circumstances. When switch S3 is depressed, the normally closed contacts open to enable the alarm circuit and the normally open contacts close to actuate the alarm. When switch S3 is released, the normally closed contacts close to disable the alarm circuit and terminate the alarm as described above.

The particular values for the resistors and capacitors described above may vary from one embodiment to another, depending on the characteristics of operational amplifier A1.

It is important that the voltage divider resistors R2 and R3 should lower the voltage at junction 28 far enough below the full voltage of vehicle battery 22 to enable operational amplifier A1 to operate. With an automotive range quad operational amplifier integrated circuit, the voltage input range should be at least 1.5 volts lower than the full battery voltage for proper operation of operational amplifier A1. In this particular embodiment, the input voltage on amplifier inputs 11 and 12 is 6 volts below the full battery voltage of 12 volts.

In cases where the lamp 10 is either burned out or has one of the conductors leading to it cut, the alarm will fail to go off when closure C is opened due to the fact that no current will be drawn through lamp 10 under those circumstances. Therefore, it is preferable to couple the ungrounded side of S1 through a diode D5 to conductor 32 to place the contacts of switch S1 in parallel with the contacts of switch S4 so that the alarm will be activated when S1 closed even though lamp 10 may be burned out or disconnected. Diode D5 is poled to isolate the positive voltage of battery 22 from conductor 32 which normally has +6 volts thereon until it is grounded by switch S1 or S4. The grounding of conductor 32 sets the alarm off by lowering the voltage applied to the two inputs of operational amplifier A1.

Any suitable alarm circuit which is responsive to the positive output voltage of operation amplifier A1 can be used. For example, a siren which is energized by a relay can be used, the relay being coupled to the output 14 of operational amplifier A1 to be activated thereby in response to unauthorized opening of one of the vehicle's compartment closures, i.e., one of the doors, the trunk, or the hood. However, in this embodiment, a two-tone audio oscillator is used as an alarm circuit, the frequency of the oscillator being shifted periodically between two different frequencies.

Two operational amplifiers A3 and A4 are used in this alarm circuit and are both connected in a known manner with resistors and capacitors to form two free running multivibrators. Resistors R10, R12, R13 and capacitor C5, together with operational amplifier A3, form one free running multivibrator having an audio frequency which is determined by the value of capacitor C5 and by the value of resistors R10, R12, and R13 which form the discharge path for capacitor C5. Resistors R12, R14, R15, R16 and capacitor C6, together with operational amplifier A4, form the second free running multivibrator. It should be noted that resistor R11 is a common bias resistor for both oscillators and that resistor R12 is also common to both circuits. The frequency of the second free running multivibrator (A4, et al.) is determined by the value of capacitor C6 and by the value of resistors R12, R14, R15 and R16 which form the discharge path for capacitor C6. The frequency of the second free running multivibrator (A4, et al.) determines the rate at which th first free running multivibrator (A3 et al.) changes its frequency. The low frequency (e.g., 1 hertz) square wave applied from the positive signal input 39 of the second free running multivibrator (A4 et al.) to the positive signal input 40 of the first free running multivibrator (A3 et al.) causes the latter to periodically shift its frequency of oscillation from one audio frequency to another. The two-tone output of operational amplifier A3 is applied from output 41 to the base of transistor Q1 which is coupled in a known manner with resistor R17 and transistor Q2 to form a Darlington pair amplifier. An audible output is produced by a speaker 42 coupled in series with the collector of transistor Q2.

The above-described two-tone audio oscillator can be disabled by a positive voltage applied to the negative signal input 44 of operational amplifier A3. For this purpose the normally zero output voltage of operational amplifier A1 is applied through register R18 to the input 46 of an inverting amplifier formed by operational amplifier A2 and the fixed positive input voltage applied through resistor R19 to the positive signal input 48 of operational amplifier A2. The output 50 of inverting amplifier A2 is applied through diode D4 to the negative signal input 44 of operational amplifier A3. Normally, the output of inverting amplifier A2 is the full positive battery voltage which acts to disable the audio oscillator (A3, et al.). The low frequency multivibrator (A4 et al.) continues to oscillate but does not produce any audible output. When an intrusion occurs, the output of operational amplifier A1 jumps from zero to the full positive battery voltage. This causes the output of inverting amplifier A2 to drop from the full positive battery voltage to a negative value which cuts off diode D4 and allows the audio oscillator (A3 et al.) to oscillate freely and produce the two-tone audio output which will continue until the output of operational amplifier A1 is returned to zero by turning key switch S1 to its OFF position.

The particular values for the resistors and capacitors may vary from one embodiment to another depending on the characteristics of operational amplifiers A2, A3 and A4 and with the desired frequencies for the two free running multivibrators.

I claim:

1. A vehicle intrusion alarm circuit for use in combination with a vehicle having at least one compartment, an openable compartment closure therefore, at least one electrical load element for coupling to a battery, and switch means for energizing said load element when said compartment closure is opened, said intrusion alarm circuit comprising an operational amplifier having two inputs and an output, said operational amplifier being operable to produce an output signal which is proportional to the difference between its two input signals, means coupling both of said operational amplifier inputs to the ungrounded terminal of said battery, a capacitor coupled between one operational amplifier input and ground, the voltage on said capacitor and said one input being substantially equal to the voltage on said other input when the load element is deenergized and the voltage on said other input changing incidental to energization of said load element and coincidental change in said battery voltage to thereby produce a voltage difference between said inputs for operating said amplifier, alarm means coupled to the operational amplifier output, said alarm means being operable to produce an audible alarm in response to an output signal of said operational amplifier caused by the opening of said compartment closure, and alarm disabling means accessible from outside said vehicle for disabling said alarm circuit to permit opening of said compartment closure without activating said alarm.

2. The intrusion alarm circuit of claim 1 and further comprising a voltage divider coupled between said operational amplifier inputs and the ungrounded terminal of said battery to reduce the input voltage to said operational amplifier below the full output voltage of said battery.

3. The intrusion alarm circuit of claim 2 wherein the output voltage of said voltage divider is at least 1.5 volts lower than the full output voltage of said battery.

4. The intrusion alarm circuit of claim 1 and also including means accessible from the inside of said vehicle for manually activating and de-activating said audible alarm while said alarm circuit is disabled by said alarm disabling means.

5. The intrusion alarm circuit of claim 1 and also including means for decreasing the voltage applied to said operational amplifier inputs to actuate said audible alarm in response to opening of one of the vehicle closures which does not energize said electrical load element.

6. The intrusion alarm circuit of claim 1 and also including a potentiometer having an arm terminal and two end terminals, each end terminal being coupled to a corresponding one of said operational amplifier inputs, and said arm terminal being coupled to the ungrounded terminal of said battery.

7. A vehicle intrusion alarm circuit for use in combination with a vehicle having at least one compartment, an openable compartment closure therefor, a battery for supplying electric power in said vehicle, at least one electrical load element coupled to said battery, and switch means for energizing said load element when said compartment closure is opened, said intrusion alarm circuit comprising an operational amplifier having two inputs and an output, said operational amplifier being operable to produce an output signal which is proportional to the difference between its two input signals, a potentiometer having an arm terminal and two end terminals, each end terminal being coupled to a corresponding one of said operational amplifier inputs, and said arm terminal being coupled to the ungrounded terminal of said battery, a first resistor coupled between one potentiometer end terminal and the corresponding operational amplifier input, a second resistor coupled between the other potentiometer end terminal and the other operational amplifier input, a third resistor coupled between one operational input and ground, a fourth resistor coupled between the other operational input and ground, said first and second resistors being of the same type and being equal in resistance value and said third and fourth resistors being of the same type and being equal in resistance value to equalize temperature induced variations in the input of said operational amplifier, alarm means coupled to the operational amplifier output, said alarm means being operable to produce an audible alarm in response to an output signal of said operational amplifier caused by the opening of said compartment closure, and alarm disabling means accessible from outside said vehicle for disabling said alarm circuit to permit opening of said compartment closure without activating said alarm.

8. The intrusion alarm circuit of claim 1 wherein one of said operational amplifier inputs is a positive input and the other input is a negative input, and further comprising a positive feedback circuit including a diode coupled from the operational amplifier output to the positive operational amplifier input, the diode being poled to conduct positive voltages from said operational amplifier output to said positive operational amplifier input.

9. The intrusion alarm circuit of claim 8 wherein said alarm disabling means includes a switch coupled between said positive operational amplifier input and ground to disable said alarm circuit when said switch is closed and to enable said alarm circuit when said switch is opened.

10. The intrusion alarm circuit of claim 1 wherein said alarm means comprises a two-tone audio oscillator having an outout frequency which periodically shifts between one fixed audio frequency and another fixed audio frequency when the alarm is activated.

11. The intrusion alarm circuit of claim 7 and also including a voltage divider coupled between the arm terminal of said potentiometer and said ungrounded battery terminal to reduce the input voltage on the operational amplifier inputs with respect to the battery voltage.

12. The intrusion alarm circuit of claim 1 wherein said alarm disabling means includes a switch coupled between the ungrounded side of said capacitor and ground.

13. The intrusion alarm of claim 12 and also including a resistor coupled between said switch and said capacitor.

14. The intrusion alarm circuit of claim 5 wherein said means for decreasing the voltage applied to said operational amplifier inputs includes a voltage divider coupled between said operational amplifier inputs and said ungrounded battery terminal, and normally open switch means coupled to said voltage divider to change the voltage division ratio thereof when said switch is closed.

15. The intrusion alarm circuit of claim 2 in which said switch means includes a pair of normally open contacts which close when said compartment closure is opened, and open when said closure is closed, one of said contacts being coupled to ground and the other being coupled to said load element, and the ungrounded contact of said normally open contact pins being coupled through a diode to said voltage divider to reduce the output of said voltage divider when said compartment closure is opened and thus to activate said alarm in the event that said load element is disconnected from the circuit.

16. The intrusion alarm circuit of claim 1 including a second battery, a pair of diode means connected in opposed polarity relationship between corresponding polarity terminals of the aforesaid battery and the second battery, said means for coupling said operational amplifier inputs to said battery being connected between said diode means.

* * * * *